US006688423B1

(12) United States Patent
Beatty et al.

(10) Patent No.: US 6,688,423 B1
(45) Date of Patent: Feb. 10, 2004

(54) FLUID-BORNE NOISE SUPPRESSION

(75) Inventors: James Beatty, Marysville, MI (US); Michael Demchak, Pontiac, MI (US)

(73) Assignee: Dana Corporation, Toledo, OH (US)

( * ) Notice: Subject to any disclaimer, the term of this patent is extended or adjusted under 35 U.S.C. 154(b) by 47 days.

(21) Appl. No.: 09/833,177

(22) Filed: Apr. 11, 2001

Related U.S. Application Data
(60) Provisional application No. 60/245,760, filed on Nov. 3, 2000.

(51) Int. Cl.[7] .............................. F16F 7/00; F16F 15/00; F16F 55/04; F16F 33/00; B23P 17/00
(52) U.S. Cl. ...................... 181/207; 181/233; 181/255; 138/40; 138/26; 285/242; 285/256; 29/419.2
(58) Field of Search ................................ 181/207–209, 181/233, 224, 226, 255; 138/26, 30, 40, 44; 285/239, 242, 252, 256; 29/419.2, 421.1

(56) References Cited

U.S. PATENT DOCUMENTS

| | | | |
|---|---|---|---|
| 3,323,305 A | | 6/1967 | Klees |
| 3,848,325 A | | 11/1974 | Bimba |
| 3,878,867 A | * | 4/1975 | Dirks .......................... 138/30 |
| 3,992,773 A | | 11/1976 | Duffner et al. |
| 4,026,628 A | | 5/1977 | Duffner et al. |
| 4,063,208 A | * | 12/1977 | Bernatt ....................... 29/419.2 |
| 4,073,219 A | | 2/1978 | Bimba |
| 4,610,069 A | * | 9/1986 | Darbois ..................... 29/419.2 |
| 4,702,543 A | * | 10/1987 | Hager ........................ 29/419.2 |
| 5,052,947 A | | 10/1991 | Brodie et al. |
| 5,141,820 A | * | 8/1992 | Sukimoto et al. ........... 148/437 |
| 5,195,788 A | | 3/1993 | Oetiker ....................... 285/252 |
| 5,390,732 A | * | 2/1995 | Bathla ......................... 165/153 |
| 5,495,711 A | * | 3/1996 | Kalkman et al. ............. 138/26 |
| 5,539,164 A | * | 7/1996 | van Ruiten ................. 181/233 |
| 5,749,396 A | * | 5/1998 | Takahashi et al. ........... 138/26 |
| 5,813,264 A | | 9/1998 | Steingroever |
| 5,819,807 A | | 10/1998 | Reed |
| 5,853,508 A | * | 12/1998 | Tack et al. ................... 148/417 |
| 5,941,283 A | * | 8/1999 | Forte ........................... 138/26 |
| 5,992,898 A | | 11/1999 | Saylor |
| 6,073,656 A | | 6/2000 | Chen et al. |
| 6,155,378 A | | 12/2000 | Qatu et al. |
| 6,158,472 A | * | 12/2000 | Hilgert ........................ 138/26 |
| 6,269,841 B1 | * | 8/2001 | Chen et al. .................. 138/30 |
| 6,338,363 B1 | * | 1/2002 | Chen et al. .................. 138/26 |
| 6,389,697 B1 | * | 5/2002 | Benoit et al. .............. 29/897.2 |

FOREIGN PATENT DOCUMENTS

JP  02117705 A  * 5/1990  ........... B21B/17/14

* cited by examiner

Primary Examiner—Robert Nappi
Assistant Examiner—Edgardo San Martin
(74) Attorney, Agent, or Firm—Reising, Ethington, Barnes, Kisselle, P.C.

(57) ABSTRACT

A method of securing a restrictor, having an open hollow cylindrical end shell, to a spirally wound tuning cable having an end disposed in the shell, wherein the shell is magnetically deformed radially inwardly to grip and conform to the outer surface of the tuning cable end. The restrictor may be of steel, brass or, most preferably, aluminum construction.

14 Claims, 2 Drawing Sheets

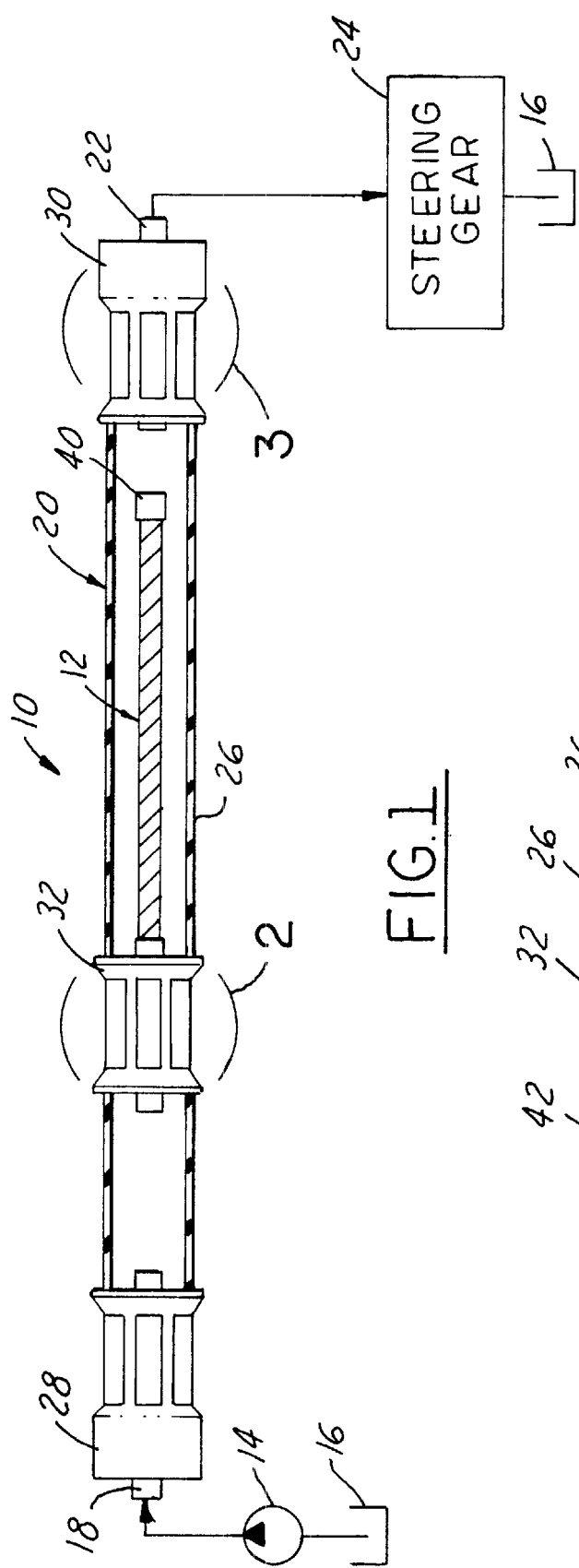
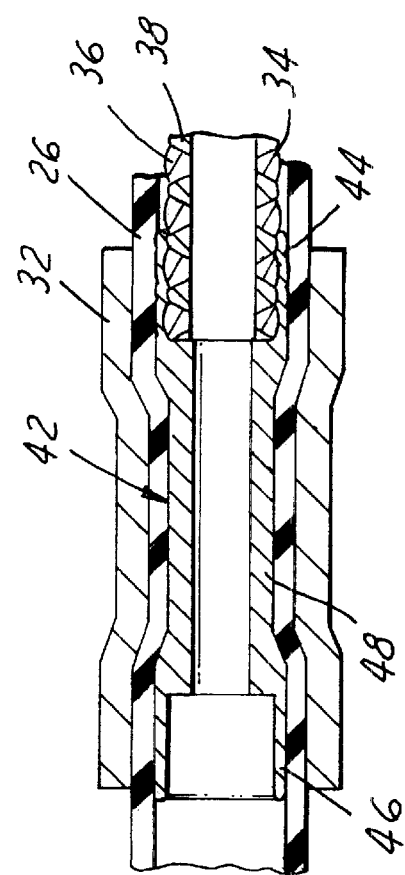
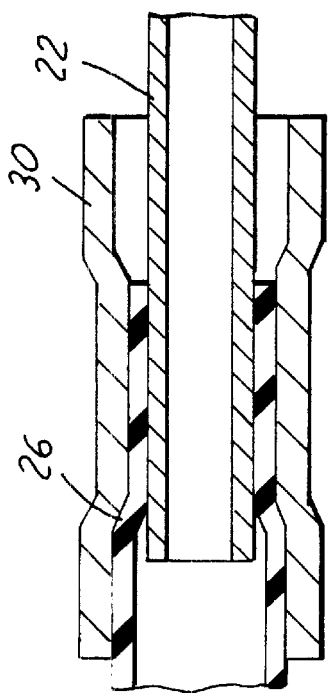

FLUID-BORNE NOISE SUPPRESSION

This application claims the benefit of provisional application Serial No. 60/245,760 filed Nov. 3, 2000.

The present invention relates to suppression of fluid-borne noise in hydraulic fluid handling systems, such as automotive power steering, power brake, air conditioning and fuel distribution systems, and more particularly to interconnection of fluid noise attenuation tuning cables in fluid handling systems.

BACKGROUND AND OBJECTS OF THE INVENTION

There are many applications in industry and commerce where it is desirable to suppress fluid-borne noise in hydraulic power systems and other fluid handling systems. As an example, it is desirable to attenuate or suppress fluid-borne noise generated by the pump or fluid valving in automotive power steering, power brake, fuel distribution and air conditioning systems. It is also desirable to suppress compressor noise in domestic and commercial air conditioning systems. Fluid-borne noise can also be a problem in various industrial hydraulic systems where the fluid pressure pulses generate an audible and objectionable noise, causing wear and fatigue of system components, and potentially exceeding OSHA requirements.

The inherent design of fluid pumps, whether driven my an internal combustion engine, an electric motor or fluid system valves, causes pressure fluctuations or pulses in the fluid line that generate fluid-borne noise. The pistons, gerotors, gears, vanes or other fluid displacement elements that pump the fluid cause pressure fluctuations, ripple or pulses within the fluid at a frequency that is dependent on pump speed. The geometry and inherent characteristics of the pump can also be sources of fluid pressure fluctuations and vibrations. During normal operation of an automotive power steering system, for example, hydraulic fluid pressure can repetitively vary and thereby generate a pressure-dependent waveform that can range substantially in magnitude or amplitude between upper and lower values, and can cause or induce system vibrations. The frequency of such fluid-borne vibration also can vary substantially with the speed of the driving component (e.g., an engine) and other factors.

It has been proposed to employ noise compression cavities in fluid handling systems for suppressing this fluid-borne noise. The cavity may be of elastic hose material, for example, for suppressing pressure fluctuations by elastic attenuation. One or more tuning cables may also positioned within the cavity, of lengths associated with selected harmonics of the fluid-borne-noise, for enhanced noise attenuation. These cables conventionally comprise a pair of metal wires, such as steel, tightly spirally wound to form an elongated hollow tube, which is cut to desired length associated with the noise harmonics. The cable is secured within the cavity, and the ends of the cables are secured to each other where two tuning cables are used, by a restrictor or dogbone. This restrictor has a central tubular section and an enlarged cylindrical shell at one or both ends of the center section. This shell is conventionally swaged or mechanically crimped over the end of the tuning cable to secure the cable to the restrictor. The tuning cable or cables reduce the pressure ripple that causes fluid-borne noise by allowing a small amount of fluid to leak between the spiral wrappings into the cavity chamber that surrounds the cables.

However, problems are encountered associated with securement of the restrictor to the end(s) of the cable(s). Specifically, the spirally wrapped wires that form the tuning cable impart an undulating contour to the outer surface of the cable. When a mechanical crimping or swaging force is applied to the restrictor shell at a level sufficient to deform the shell inwardly around the undulating surface of the cable end, this force can cause separation between the spirally wrapped cable wires, resulting in excessive fluid leakage at the cable end. It is a general object of the present invention to provide a method of securing the restrictor to the end of a tuning cable length that reduces this fluid leakage problem, but maintains sufficient tensile strength at the restrictor/cable joint. Another object of the present invention is to provide a noise attenuation tuning cable assembly constructed in accordance with such method.

SUMMARY OF THE INVENTION

In general, the foregoing and other objectives are obtained in accordance with the invention by magnetically deforming the restrictor shell over an end of the tuning cable. The restrictor is preferably of relatively soft metal construction, such as brass or aluminum. AA6061 and AA6063 aluminum are particularly preferred. The restrictor may be heat treated to soften the material sufficiently to permit magnetic deformation over the end of the tuning cable while allowing the material of the restrictor shell closely to follow the undulating contour of the outer surface of the tuning cable end. It has been found that fluid leakage is greatly reduced while maintaining desirable tensile strength at the magnetically formed restrictor/cable joint.

A method of making a fluid noise attenuation tuning cable assembly in accordance with one aspect of the present invention comprises the steps of providing a length of tuning cable having metal wires spirally wrapped to form a hollow tube, and a restrictor having a hollow interior and an enlarged cylindrical end shell. An end of the tuning cable is placed within the restrictor end shell, and the restrictor end shell is magnetically deformed radially inwardly around the end of the tuning cable. The tuning cable assembly may include a single tuning cable secured to one end of the restrictor, or tuning cables of differing lengths secured to associated opposite ends of the restrictor.

A fluid noise attenuation tuning cable assembly in accordance with another aspect of the invention thus includes at least one length of tuning cable having wires spirally wrapped to form a hollow tube, and a restrictor having a hollow end shell received over an end of the tuning cable. The restrictor shell is magnetically deformed radially inwardly to grip the end of the tuning cable length. A pair of tuning cables may be secured to respective ends of the restrictor, with the tuning cables being of differing lengths. In the preferred implementation of the invention, the tuning cable assembly is disposed within an elastic hose, and a band externally secures the hose to the restrictor.

BRIEF DESCRIPTION OF THE DRAWINGS

The invention, together with additional objects, features and advantages thereof, will be best understood from the following description, the appended claims and the accompanying drawings in which:

FIG. 1 is a partially sectioned schematic diagram of a fluid handling system equipped with a fluid noise attenuation tuning cable assembly in accordance with one presently preferred embodiment of the invention;

FIGS. 2 and 3 are fragmentary sectional views on an enlarged scale of the portions of FIG. 1 within the respective circles 2 and 3;

DETAILED DESCRIPTION OF PREFERRED EMBODIMENTS

Figure 4:
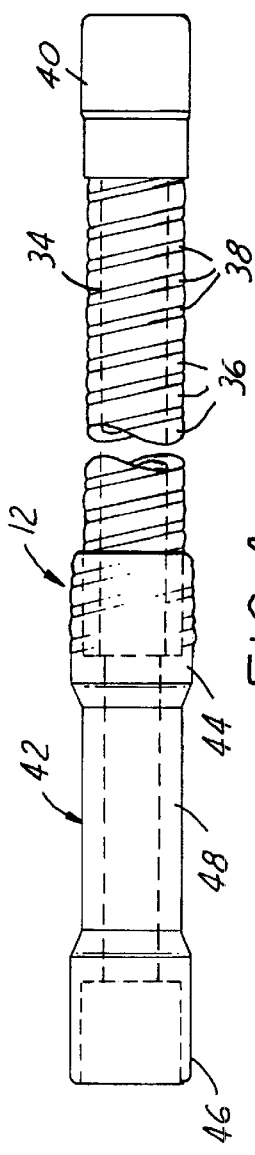
FIG. 4 is an elevational view on an enlarged scale of the tuning cable assembly in the fluid handling system of FIG. 1.

The disclosure of U.S. Pat. No. 6,155,378 is incorporated herein by reference for purposes of background.

FIG. 1 is a schematic diagram that illustrates a fluid handling system in the form of a hydraulically actuated power steering system 10 that incorporates a fluid noise attenuation tuning cable assembly 12 in accordance with one embodiment of the invention. Power steering system 10 includes a pump 14 for applying hydraulic fluid under pressure from a sump 16 to the inlet fitting 18 of a fluid noise suppression cavity 20. Cavity 20 has an outlet fitting 22 from which fluid is fed to sump 16 through a steering gear system 24. Cavity 20 includes a hose 26 of suitable radially elastic construction. Hose 26 has respective axial ends secured to fittings 18, 22 by radially crimped sleeves 28, 30. Intermediate its respective axial ends, hose 26 is secured to tuning cable assembly 12 by means of a radially inwardly crimped sleeve or wedding band 32.

Referring to FIGS. 1–2 and 4–5, tuning cable assembly 12 includes a length of tuning cable 34. Tuning cable 34 conventionally includes one or more continuous spirally wrapped metal (steel) wires. Tuning cables of this type are well known in the art, and are marketed for example by Versatube Corp. of Troy, Mich. Autotech Ltd. of Birmingham, England, FTL Co. Ltd. of Morley Leeds, England, Bergen Cable of Lodi, N.J., Nelson Steel Products of Hatfield, Pa., Skill Mfg. of Traverse City, Mich., Hi-lex Corp. of Battle Creek, Mich. and Universal Metal Hose of Chicago, Ill. In the specific embodiment illustrated in the drawings, there are two wires 36, 38 that have complementary substantially trapezoidal cross sections so that the wires axially nest together to form a continuous hollow tube having a generally constant wall thickness. The geometries of wires 36, 38 lend a generally undulating contour (FIGS. 2 and 5) to the outer surface of the tube. An end cap 40 is secured to one end of cable 12 to prevent unraveling. The opposing end of cable 12 is secured to a restrictor or dogbone 42.

Figure 5:
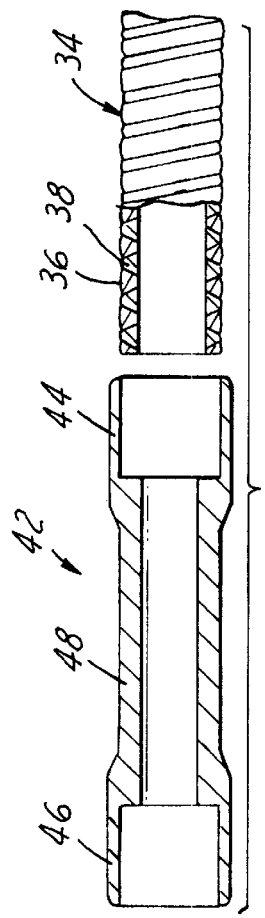
FIG. 5 is an exploded sectioned elevational view of the tuning cable assembly illustrated in FIG. 4.
Figure 6:
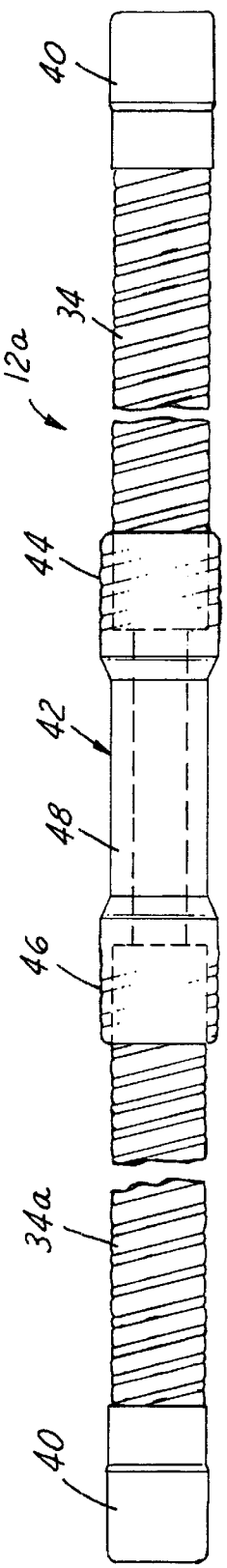
FIG. 6 is a fragmentary elevational view of a tuning cable assembly in accordance with a modified embodiment of the invention.

Restrictor 42 includes a pair of end shells 44, 46 interconnected by a hollow center segment 48 of reduced outside diameter. End shells 44, 46 are cylindrical in contour and have open interiors sized for close sliding receipt of a corresponding end of a length of tuning cable 34. After an end of tuning cable 34 is inserted into shell 44, for example, shell 44 is magnetically deformed over the exterior surface of cable 34 securely to grip the end of cable 34 within the restrictor end shell. Suitable magnetic forming techniques are known in the art, and generally contemplate placement of an electric coil around the work piece, in this case the assembly of tuning cable 34 within restrictor end shell 44, and discharge of electrical current through the coil. The resulting magnetic field generates an opposing current in shell 44. The interaction of the opposing magnetic fields causes deformation of the shell material radially inwardly against the outer surface of cable 34. This magnetic forming operation has the advantage of securely fastening restrictor shell 44 to cable 34 without crushing or deforming the end of the cable. The relatively thin material of restrictor shell 44 conforms to the undulations of the outer surface of the tuning cable. This is evidenced by comparing the smooth surfaced interior and exterior configuration of shell 44 as shown in FIG. 5, prior to such deformation, with the undulating interior configuration of shell 44 as shown in FIG. 2 and the undulating exterior configuration of shell 44 as shown in FIGS. 4 and 6, after shell 44 has undergone such magnetic forming deformation. In the tests discussed hereinafter, a Magneform (trademark of Magneform Corp. of San Diego, Calif.) forming machine was employed. Other suitable magnetic forming machines could also be employed.

Fluid leakage is greatly reduced as compared with conventional swaging or mechanical crimping techniques, while maintaining tensile strength at the restrictor/cable joint. Specifically, use of the preferred aluminum material for restrictor 42 results in an order of magnitude reduction in fluid leakage at the joint, producing a 5 dB increase in noise attenuation. This reduction in fluid leakage and consequent increase in noise suppression results from intimate surface contact between the inside diameter of the restrictor shell and the outside surface of the tuning cable end, without deforming or crushing the tuning cable end which might cause separation between the cable wires 36, 38 and consequent fluid leakage. In the test results described hereinafter, most of the magnetically formed joints exhibited a leak rate of no more than 10 ml/min at 15 psi, and many had a leak rate less than 1 ml/min. Leakage at mechanically crimped assemblies can vary from under ten to several hundred ml/min, depending on the amount of collapse in the cable under the crimp, which is difficult to control. A joint tensile strength of 25 lbf minimum is retained. It is currently preferred to form restrictor 42 of aluminum or brass because of the low yield strengths, ease of machinability and ease of magnetic deformation associated with these metals. Aluminum, particularly AA6061 aluminum alloy, is particularly preferred. Heat treatment of two to ten minutes at 415° C. can anneal such an aluminum restrictor, providing a hardness not greater than 60 HR15T (measured at the center portion 48 of the restrictor), with satisfactory results.

FIG. 6 illustrates a modified tuning cable assembly 12a that includes a restrictor 42 and a tuning cable 34, 34a secured by magnetic deformation to opposed associated end shells 44, 46 of the restrictor. Tuning cables 34, 34a are preferably of differing lengths associated with differing harmonics of the fluid pressure fluctuations to be suppressed.

Evaluate the Use of Magnetic Forming to Attach Restrictors ("Dogbones") to Tuning Cables Instead of a Traditional Crimp Fluid leakage at a mechanical crimp joining a steel dogbone to a tuning cable is a significant concern in fluid noise reduction. When combined with a typical production tuning cable (such as supplied by Versatube), the leakage through the joint has been found significantly to reduce the effectiveness of a standard tuning solution on some automotive vehicle platforms. Further investigation found that the crimp range necessary to ensure conformance to the 25 lbf tensile requirement collapsed the cable by 15 to 20%; that plus the gaps under the shell created during crimping were responsible for the excessive leak. Previous work had focussed on use of a sealant (silicon, heat-shrink tubing) to cover the joint and thus eliminate leakage; leakage rate was improved, but concerns about durability, fluid compatibility, and customer acceptance remained unresolved.

Given the above conditions, a number of potential solutions were examined, and use of a magnetically formed joint was found to be the most viable option. Initial trials were performed with the 12-kJ Magneform device and Versatube tuning cables in using dogbones made of a variety of materials (source—Tech-Tool), including aluminum (AA6061), brass (CA 360), and stainless steel (303/304L SS). Two shell designs were tried—the current 0.35 inch (axial length) dogbone shell and a 0.75 inch long extended shell. Trials with brass and steel dogbones were considered to be unsatisfactory. However, it was discovered that the aluminum dogbones would magnaform after an improvised torch anneal of the shells. Several samples were built in this manner; six were used for tensile testing (three with short shells, three with long), while another six (three short, three long) were used for tensile testing.

Fluid leakage rate results were remarkably improved, with 3 of 6 samples having leak rates under the 20 ml/min target and only one gross leak; in comparison, the traditional crimped design often had leak rates so large that they could not be readily measured with the test apparatus. Tensile results were surprisingly high, ranging from 69 to 77 lbf for the short shell and 66 to 95 lbf for the long shell; in comparison, typical values for the mechanical crimp joint ranged from 38 to 64 lbf. The soft aluminum shell was observed to conform closely to the outer surface of the cable with no apparent collapse of the cable windings.

A second set of test samples was prepared using aluminum (AA6061), brass (CA 360) and stainless steel (303/304L SS) (source—Tech-Tool); again, Versatube tuning cables were used as part of the assembly. This time, the samples were heat-treated in the Vulcan Furnace in an attempt to find a point at which the shells would be soft enough to form magnetically but with the center "barrel" strong enough to handle the pressure imposed by the crimp of band 32 (FIGS. 1–2). A second set of magnetic forming trials using these samples, various power levels (80 to 100%), and (on brass and steel samples only) two different shell wall thicknesses (the standard 0.028 inch nominal wall thickness and a thinner 0.020 inch thickness) was performed. Fluid leakage rate testing was performed to measure the quality of the joint. Again, forming of the stainless steel parts was unsatisfactory, with only slight deformation of the fully annealed shell (1 hour at 1070° C.) visible at 100% power. Based on this, it was determined that stainless steel could be used in this application, but would require use of a magnetic forming tool of higher power.

Several of the CA 360 brass samples with extended shells, and with both thick and thin shell walls, were successfully magnetically formed at power levels of 80 to 100%. In all cases, the samples had been heated for 30 min at 500° C. (and air-cooled) prior to forming. Post-test analysis indicated that shell wall thickness was not a significant factor in fluid leakage rate performance of the magnetically formed joint, with similar leak rate results being shown by both thick and thin shells. Best results were achieved at 100% power, where 6 of 8 samples built later passed leakage rate testing with leak rates at the joint under 20 ml/min (range: 0.7 to 32 ml/min). However, inasmuch as Maxwell Magneform (builder of the Andrews Magneform unit employed in these tests) recommends against operating at power levels above 85%, it was determined that brass would require a magnetic forming device of increased power capability.

Greatest forming success was achieved with the AA6061 aluminum samples with both short and extended shells over a range of heat treatments and power levels ranging from 80 to 100%. The short shell was surprisingly comparable to the extended shell in fluid leakage rate testing: 7 of 14 short-shell samples had leak rates under 20 ml/min, while only 7 of 17 extended shell samples had similar results. Results at 100% power were somewhat better than at 85% (3 of 5 good at 100%, 10 of 24 good at 85%); however, the small sample size at 100% and the variety of heat treatments tried at 85% make such judgements uncertain. Six different heat treatment cycles were tested; all involved heating to 415° C., with times ranging from 1 to 10 minutes and both air (fast) and furnace (slow) cooling. Best results were achieved with heat treatments of 8 to 10 minutes at 415° C. followed by air cooling (10 min—HT 5; 8 min—HT 8), with 7 of 12 samples tested having leak rates under 20 ml/min. The data, however, were highly variable—good parts tended to range from 0.7 to 20 ml/min, while the rates of bad samples measured as high as 130 ml/min, with several samples leaking at rates so high that they could not be accurately measured by the test apparatus. Crimp diameter measurements were made of all "good" samples; from these, collapse of the tuning cable under the joint was calculated at 0 to 2.3%. Tensile testing (after leak testing) was performed after leak testing; values ranged from 29 to 60 lbf, considerably lower than in previous testing. The low values are believed due to power steering fluid remaining inside the joint after leak rate testing, which may have reduced friction between the shell wall and the tuning cable.

It was noted during fluid leakage rate testing that the Versatube tuning cables appeared to be of uneven quality, with noticeable differences in the quality and consistency of the wire winding in the cable. There was a strong correlation between the quality of the cable and leakage at the joint; cables that leaked profusely were less likely to be readily sealed at the restrictor joint. Accordingly, a third set of magnetically forming trials was performed using Autotech tuning cables, which were reported to have a more consistent leak performance than the Versatube product. Thirty piece capability studies indicated that Autotech had somewhat better control of the cable OD than Versatube (Autotech Cpk 0.86; Versatube Cpk 0.71), which was thought to offer improved consistency at sealing the joint. Thirty samples were built using Autotech cables, 85% power, and aluminum (AA 6061) restrictors—half with the HT 5 heat treatment (10 minutes at 415° C.) and the remainder with the HT 8 heat treatment (8 minutes at 415° C.). Two of each group were used for tensile testing, while the remainder underwent fluid leakage rate testing; of these, several were mounted and sectioned to examine the interior of the joint, while the remainder were set aside to be used in later testing. The tensile data was comparable to previous testing, with values of 68 to 76 lbf (HT 5: 75 to 76 lbf; HT 8: 68 to 70 lbf) being measured. Leak rate results at the joint were the best yet recorded, with values of 0.3 to 11.3 ml/min for the 13 HT 5 samples and 0.7 to 6.3 ml/min for the 13 HT 8 samples. This improvement over the earlier fluid leakage rate results is believed due to the superior performance of the Autotech cables. These results were compared using WinSmith Weibull software with two other joint designs—a tubing sleeve design and a swedged-crimp joint currently produced by Autotech. Leak rate results for the tubing sleeve design were 1.7 to 12.7 ml/min for the 6 samples tested, comparable to the magnetic forming data; the Autotech swedged joint was considerably worse, with leak rates of 13.3 to 220 ml/min measured for the 10 samples tested.

The data was analyzed using both Weibull and lognormal distributions; goodness-of-fit analyses and the small sample sizes (<30 measurements) indicated that Weibull was the preferred distribution, while the downward curve of the Weibull plots was consistent with a lognormal distribution. Likelihood contour plots at 90% confidence using modified maximum likelihood estimates (MLE) of the mean and variance of each data set indicated that the magnetically formed joint and tubing sleeve may be dependent, while the swedged joint data set was independent of the others. The most likely interpretation of this is that the performance of the magnetically formed and tubing sleeve joints is limited primarily by the tuning cable (the common factor between the three sets). The swedged joint, while considerably better than the current-production radial crimp, is significantly less capable than the magnaform design. The β-values for all for data sets were 1.03 to 1.59, indicating a high degree of randomness in the data; this implies that there is potential to improve performance even further, perhaps through tighter dimensional control or changes in joint design. A table of the calculated mean and variance is shown below:

than typical radial-crimp values; although the AA 6063 samples were less strong, they also met current tensile requirements when magnaformed without a heat treatment, making this alloy potentially more attractive from a production perspective. CA 360 brass was also magnetically formed with success at 100% power; with more power or a more readily formable alloy (i.e., lower yield strength), brass would also be a usable material for this process. Trials with steel were not satisfactory; it appears a more powerful Magnaformer would be required for most steel alloys, even with full anneal.

Determine if Untreated AA6053-T6 Restrictors Magnetically Formed to Autotech Tuning Cables Will Meet 25-Lbf Tensile Strength Requirements and Max 20 Ml/Min Joint Leak Target Requirements. Compare Performance to AA6061-T6 Restrictors (Heat-Treated) and Conventional Radially-Crimped Steel Restrictors as Appropriate

| | | Crimp Joint Leak - Calculated Mean and Variance (Rank Regression-Monte Carlo, 90% Confidence) | | | | | |
|---|---|---|---|---|---|---|---|
| | | 95% Lower Bound (ml/min) | | Nominal (ml/min) | | 95% Upper Bound (ml/min) | |
| Distribution | Joint | $\mu$ (Mean) | $\sigma$ (Variance) | $\mu$ (Mean) | $\sigma$ (Variance) | $\mu$ (Mean) | $\sigma$ (Variance) |
| Weibull | Magneform (HT 5) | 4.478 | 7.070 | 4.989 | 4.835 | 7.508 | 4.615 |
| (2-Parameter) | Magneform (HT 8) | 1.688 | 2.057 | 1.943 | 1.466 | 2.749 | 1.394 |
| | Tubing Sleeve | 6.964 | 10.633 | 7.375 | 5.029 | 13.140 | 5.108 |
| | Autotech Swedge | 32.654 | 33.042 | 39.477 | 25.377 | 57.598 | 24.171 |
| Lognormal | Magneform (HT 5) | 2.350 | 1.933 | 5.840 | 9.684 | 16.129 | 46.942 |
| | Magneform (HT 8) | 1.059 | 0.644 | 2.210 | 2.634 | 4.495 | 8.410 |
| | | 3.687 | 1.193 | 7.953 | 7.356 | 18.759 | 30.736 |
| | Tubing Sleeve | | | | | | |
| | Autotech Swedge | 23.341 | 11.381 | 44.380 | 43.539 | 89.661 | 140.635 |

The above samples were originally specified as AA 6063, but were made of AA 6061 by the vendor. A second set of 400 pieces was received from a second vendor (AllTool) made of AA 6063. After hardness checks revealed a discrepancy between these and the previous lot, the material compositions of the AllTool and TechTool restrictors were verified. A heat-treatment cycle of 2 to 3 minutes at 415° C. (HT 9 & 10) was found to produce similar changes in hardness as the HT 5 and HT 8 cycles had for the AA 6061 samples. However, calculations using equations provided by Maxwell Magneform indicated that it should be possible to magnaform AA 6063 as received (no heat treatment). A total of 4 AA 6063 samples were then magnaformed to Autotech tuning cables (using 85% power); two samples each were tested for leakage rate and tensile strength. Leakage rate performance was excellent, with values of 1.0 to 1.3 ml/min. Tensile performance, while exceeding 25-lbf, was considerably lower than the AA 6061 samples (36 to 41 lbf).

The above results indicate that, given the design requirements outlined above, magnetic forming is a suitable replacement to the current radial mechanical crimp joint used to secure a tuning cable to a restrictor, particularly when using Autotech tuning cables. Leak rates for the magnetically formed Autotech cables were a phenomenal improvement over the conventional radial crimp-Versatube cable assembly. Other joint designs (tubing sleeve, Autotech's swedged joint) also out-performed the conventional joint, but did not equal the magnetically formed joint's leak performance (although the tubing sleeve was very close). Tensile values for the AA 6061 samples were much better A total of 58 tuning cable assemblies using untreated AA6053-T6 restrictors magnetically formed to Autotech tuning cables were built for this test, along with 45 assemblies using the current radially-crimped steel restrictor and Versatube tuning cables as controls. All samples were built (Magneform at 85% power; crimp at 0.338 inch). Cable OD, crimp dia., and shell ID and OD measurements were collected on all magnetically formed samples.

Half of the magnetically formed samples were tensile-tested (at a pull rate of 1 inch/min) along with 30 of the control samples; the remainder of the magnaform samples underwent leakage rate testing to determine leak at the cable joint. After leakage rate testing, 14 of these samples were tensile-tested as well, as prior work had indicated a potential loss in tensile strength in the joint after immersion in hydraulic fluid. Fourteen control samples were immersed in Ford 1982 power steering fluid for 15 min, then tensile-tested to provide a performance baseline.

Leak results for the AA6053-T6 samples were very good, ranging from 0.33 to 8.0 ml/min, with an average of 2.4 ml/min. Radial-crimp control samples were not used for this test, as the current joint is not sufficiently sealed to allow reliable measurement of the leak. These results were comparable to the 2.21 to 5.84 ml/min average leak rates recorded for AA6061-T6 magnetically formed samples and are well under the 20 ml/min target requirement. Results from this test were compared against tensile (discussed below), hardness, crimp diameter and cable OD to spot possible trends, with the data grouped to reduce scatter. An inverse correlation between hardness of the shell and leak rate was surprisingly identified; as the shell hardness increased (from approx. 25 to 45 HR15T), the average leak rate dropped from 4.6 to 0.8 ml/min. However, as 22 of the 30 samples tested had shell hardnesses of 35 to 45 HR 15T, this correlation should be regarded as tentative.

Tensile results for the AA6053-T6 samples ranged from 19 to 55 lbf (average 35.39 lbf) for dry samples and 18 to 59 lbf (average 39.3 lbf) after leakage rate testing. In comparison, testing with heat-treated AA6061-T6 samples produced results of 56 to 76 lbf (average 66 lbf) for dry samples. The control samples ranged from 68 to 78 lbf (average 73.0 lbf) for dry samples and 70 to 83 lbf (73.9 lbf) after oil immersion. No clear evidence of reduction in tensile strength after exposure to hydraulic fluid was found. There was a significant difference in standard deviation (approx. 2 lbf) in both the magnetic-forming and radial-crimp results, but this may have been due to the reduced sample size of the "wet" tensile tests. With four dry samples recording tensile strengths under 25 lbf, it was decided that untreated AA6053-T6 is not preferred at this time.

Results from the tensile testing were compared to hardness, crimp diameter, cable OD and leak rate to spot possible trends, using grouped data to reduce scatter. As with the leak rate testing (above), an inverse correlation was identified between tensile strength and hardness, with strength of the joint decreasing by up to 10 to 20 lbf as hardness increased from 30 to 50 HR15T. This fit previous hypotheses that harder material would require more of the Magneformer's coil strength to move, and thus would have less potential clamping force. As above, the majority (33 of 43) of the samples tested had hardnesses in the 35 to 45 HR15T range; however, enough points were available at other hardnesses to make this correlation credible.

An inverse correlation between cable OD and tensile strength was also identified, with tensile strength dropping up to 12 to 18 lbf with an increase of cable OD from 0.302 inch to 0.308 inch. This was not expected, as previous hypotheses had been that the increased surface area of a larger cable would increase the hold force of the joint. Cable ODs were broadly distributed, suggesting that this correlation is also credible and that further testing of min/max cable ODs may be of importance.

A tentative correlation was also established between tensile strength and leak rate. At tensile values over 20 lbf, the leak rate appeared to increase by up to 2.9 ml/min as tensile strength increased to over 50 lbf. This would be consistent with hypotheses that the clamping force associated with high tensile values might tend to collapse the softer wire in the tuning cable, opening up gaps between the windings and thus increasing the leak rate. This should be considered in continuing work with heat-treated AA6061-T6; previous comparisons between heat treatments of differing lengths were suggestive of a similar effect.

Reliability calculations were made to estimate risk of failure to meet the tensile and leak specs, as well as risk of the joint failing under normal operating conditions. The axial tensile force on the tuning cable was determined to be the viscous force associated with the fluid flowing through the cable, which can be approximated as $F \propto \mu VL$, where $\mu$=the dynamic viscosity, V=the fluid velocity, and L=length of the cable. Normal operating conditions were defined as below, using pump flow and viscosity data provided by Ford and Exxon; viscosity, cable OD, and flow distributions were synthesized to calculate an approximate load distribution, which was then used along with the tensile data obtained above and WinSmith Weibull's "Strength-Load Interaction Calculator" to determine reliability. Results are tabulated below:

Operating Conditions

| Temperature: | 100–200° F. |
|---|---|
| Absolute Viscosity | 0.0311–0.0062 Ns/m$^2$ |
| Flow: | 1.10–2.48 gpm |
| Viscous Force (Calculated): | 0.31 lbf |

| Samples | 25 - lbf Tensile Reliability | Failures/yr | Viscous Force Reliability | Failures/yr | 20 ml/min Max Leak Rate Reliability | Failures/yr |
|---|---|---|---|---|---|---|
| Current (Radial Crimp) | 0.9$_{26}$ | 0 | 0.9$_{26}$ | 0 | — | — |
| AA6061 (Magneform) - HT 5 | — | — | — | — | 0.9$_4$89 | 0.55 |
| AA6061 (Magneform) - HT 8 | — | — | — | — | 0.997999 | 100.05 |
| AA6061 (Magneform) - Combined | 0.9$_8$874 | 0 | 0.9$_{26}$ | 0 | — | — |
| AA6063 (Magneform) - Dry | 0.858599 | 7070 | 0.9$_3$846 | 7.7 | — | — |
| AA6063 (Magneform) - "Wet" | 0.883534 | 5823 | 0.9$_3$443 | 27.85 | 0.9$_3$146 | 42.7 |

Failures/yr calculated based on an annual volume of 50,000 units

Tensile and collapse testing was performed on AA6061-T6 samples that had been annealed for 1 hr at 415° C. as a preliminary evaluation of a longer-duration heat treatment (at the request of the supplier). Tensile values ranged from 56 to 66 lbf, well above the 25 lbf requirement. Collapse under band 32 (FIGS. 1–2) at 35% compression was 1 to 2%, which was judged acceptable.

Given the above results, untreated AA6053-T6 is not preferred for this application. Although performance during leak testing was very good, the low tensile values encountered during testing were not preferred. At this time, heat-treated AA6061-T6 appears to be the best candidate for the magnetically formable restrictor, with strong tensile and acceptable leak rate results. It is believed that the apparent correlations identified above between performance, hardness and cable OD may offer opportunities to optimize the design. In particular, the inverse relationship between cable OD and tensile strength appears particularly significant. If the relationship holds true at smaller cable diameters, it may present an opportunity to re-examine an untreated AA6063 restrictor as a second option to the preferred AA6061.

Determine Effects of Impulse Testing on Aluminum Dogbones With Magnetically Formed Joints and Compare to Conventional Radial-Crimp Parts A total of 24 assemblies were built for impulse testing using Dayco DF 3907 hose and standard crimped couplings. Two assemblies were hose-only control samples (hose 26 in FIG. 1). Four contained conventional steel dogbones crimped under wedding bands (32 in FIG. 1) at 0.710, 0.715, 0.745, and 0.770 inches. The remaining 18 samples contained aluminum dogbones as follows:

621-626-AA6061-T6 dogbones with Autotech tuning cables, wedding band crimped at nominal dimensions (0.725 to 0.740 inches). These samples were placed on test first, going for 1,264,435 cycles with no failures at the wedding band crimp. All six dogbones were heat-treated 8 to 10 minutes at 415° C. prior to magnetic forming.

1-6-AA6061-T6 dogbones with Autotech tuning cables (12 in FIG. 1). The wedding band was crimped at 0.715 inch on samples 1 to 3 and 0.770 inch on samples 4 to 6. These samples were built with all six dogbones were heat-treated 8 to 10 minutes at 415° C. prior to magnetic forming. Three of these samples (4 to 6) were removed from test at 419,410 cycles with leaks at the end couplings. The remaining three were tested to 854,461 total impulse cycles with no failures at the wedding band crimp.

7-12-AA6053-T6 dogbones with no tuning cables. The wedding band was crimped at 0.710 inch on samples 7 to 9 and 0.745 inch on samples 10 to 12. These samples were built with all six dogbones heat-treated 8 to 10 minutes at 415° C. prior to magnaforming. One of these samples (10) was removed from test at 419,410 cycles with leaks at the end couplings. The remaining five assemblies were tested to 854,461 total impulse cycles with no failures at the wedding band crimp.

Performance of the controls was similar to those shown above, with three control samples (0.710, 0.745, and 0.770 inches) also pulled from test at 419,410 cycles with leaks at the end couplings. All samples met the minimum impulse life of 400,000 cycles per Ford ES-E4EC-3F536-AA. All samples with dogbones (both aluminum and steel) were torn down after testing. Three samples (6, 7 and 11) were found to have minor damage to the hose at the shoulder of the dogbone. Two samples (7 and 12) were found to have wedding bands crimped with the dogbones off-center, trapping the shell underneath the crimp bubble. Given the above results, this is not believed to have adversely affected the test. No loosening or separation of tuning cables from dogbones was observed.

Leakage rate and tensile testing was performed on all samples with tuning cables after impulse testing. For 11 of the 12 parts tested, leakage rate showed an overall decrease of 0.6 ml/min, with changes on individual samples ranging from –9 to +2.7 ml/min. Tensile results ranged from 28 to 51 lbf, significantly lower than found in parts that had not been impulse-tested although still in excess of the 25 lbf target. Mean tensile strength was 35.8 lbf for samples 1 to 3 and 44.3 lbf for samples 4 to 6; this may be due in part to the difference in test duration between the two sets.

Testing was also performed on several AA6061-T6 dogbones (heat-treated 8 to 10 minutes at 415° C.) to estimate the potential for collapse or movement under the wedding band crimp. Compression under the wedding band can range from 9.2 to 35.6%. No collapse was found with AA6061-T6 dogbones crimped at compression levels less than 30%. Significant collapse (greater than 5%) did not occur until compression exceeded 40%. Pressure testing performed with welded dogbones (no thru hole) indicated that, at 15% compression (the lightest tested), a differential pressure of 200 psi was required to force the dogbone to move under the wedding band, with 1299 psi required to blow the dogbone out from under the crimp. This was judged sufficient for this application; differential pressures on the dogbone are typically well under 100 psi.

Given the data above, the aluminum dogbone with magnetically formed joint does meet the impulse requirements of Ford specification ES-E4EC-3F356-AA. While the tensile data indicates that the joint does fatigue during impulse, the leakage rate testing suggests that the leak rate does not worsen significantly and may even improve in some cases.

Determine Rate of Hardness Recovery of Annealed AA6061-T6 Dogbones

In all, 30 AA6061-T6 aluminum restrictors annealed for 5 to 10 minutes at 415° C. during previous testing were tracked for this test, with measurements of hardness made on both the body and the shell at random intervals over a period of 46 to 52 days. All groups recovered slowly over the first 30 to 40 days, regaining on average less than 5 pts (HR15T) in hardness during that time. However, after 40 days hardness increased another 5 pts, suggesting that the rate of recovery was increasing. With the exception of the HT 4 group (5 minutes at 415° C.), hardness of the shell remained 20 to 45 pts below hardness of the restrictor body, suggesting that even parts that recovered above the current max hardness of 60 HR15T might yet be soft enough in the shell to be magnetically formed.

The data gathered indicates that the hardness of these parts remains relatively stable for up to 40 days, then begins to increase. Based on this, it is recommended that parts stored for more than 30 days be checked for hardness prior to use in production. It is also recommended that this test be repeated with parts annealed to the two proposed production heat cycles (1 hour at 415° C. and "dead soft") to confirm these results.

Determine Leakage Rate and Tensile Performance of AA6061-T6 Aluminum Restrictors Magnetically Formed to Autotech Tuning Cables in PV Testing Per DVP PS-301

Sixty samples were magnetically formed using AllTool restrictors and utotech tuning cables (dual-tuned assembly—two cables per restrictor), with the Magneformer set to 85% power initially. However, after 23 assemblies, a fault indicator was tripped in the machine, possibly due to arcing around the parts during the magnetic forming process. The power level was dropped to 80% for the rest of the build. While some arcing was still evident, no more faults occurred. All samples were subsequently identified as "85-xx" or "80-xx" to note the power setting used during forming. The two sample groups were then evenly distributed between leak rate and tensile testing.

Thirty of these samples were tensile-tested (at 1 inch/min) to determine the strength of the magnetically formed joint. The first sample tested in this manner stretched without failing; testing was halted when the tensile tester reached its travel limits, with peak tensile force recorded at 64 lbf. After trimming the long cables to 140 mm (approx.), a second sample was tested; this pulled out of the test sample jaws at 60 lbf without failure. Subsequently, end caps were crimped to the shortened cables; although two samples failed with pull-offs of the end caps prior to joint failure (both times at 59 lbf), the remaining samples were tested successfully. Tensile values ranged from 57 to 69 lbf, with pull-outs at the long cable joint on over half of all samples (17 of 26); this is well in excess the 25-lbf minimum tensile target for this assembly.

The remaining 30 samples were tested for leak at the magnetically formed joints, with leak from each joint measured separately. Leak results from the joint with the long cable were very good, ranging from 0.7 to 13.3 ml/min. However, leak near the joint with the short cable was an order of magnitude greater on average, ranging from 4.0 to 108.7 ml/min. This exceeded the target of 20 ml/min.

However, the test technician demonstrated that this gross leak originated from the tuning cable very close to (within ¼") but outside of the joint. When the cable was loaded in compression along its axis, the leak was eliminated, indicating a problem with the cable and not the joint. The most likely cause of this problem was thought to be positioning of the restrictor within the Magneformer coil. It is believed that some of the tuning cable extends into the coil when the short cable joint is formed. The forces created during forming are thought to have compressed the soft (SAE 1008) steel wire of the cable just slightly, opening up gaps between the windings and thus creating leaks.

WinSmith Weibull™ was used to determine the data distribution and analyze the data gathered from both leak and tensile testing. Both tensile and leak data were found to follow log-normal distributions. Mean and standard deviations for the samples were broken down by power level and location (long or short cable joint) were as follows:

| Tensile | 80% Power | | 85% Power | | Leak Rate | 80% Power | | 85% Power | |
|---|---|---|---|---|---|---|---|---|---|
| (lbf) | Mean | Std. Dev. | Mean | Std. Dev. | (ml/min) | Mean | Std. Dev. | Mean | Std. Dev. |
| Both Joints | 61.74 | 3.18 | 63.01 | 3.75 | Short Cable Joint | 28.67 | 41.22 | 55.99 | 41.68 |
| Short Cable Joint | 65.12 | 3.40 | 69.95 | 7.25 | Long Cable Joint | 2.66 | 3.16 | 1.81 | 0.77 |
| Long Cable Joint | 62.57 | 3.63 | 64.53 | 5.09 | | | | | |

Comparisons were also made between tensile and leakage rate results and sample hardness, cable OD and crimp diameter. Several trends were observed in the data when grouped, although scatter in the data added considerable uncertainty to the conclusions. A slight decrease in tensile strength and a somewhat stronger decrease in leak rate was noted as hardness of the sample increased. Cable OD seemed to have little influence on tensile strength, but leak rate seemed to increase with increasing diameter. Tensile strength increased as crimp diameter decreased (about 7 lbf over a 0.006 inch decrease, on average); while leak rate followed this pattern as well at 80% power, results from samples formed at 85% power were mixed.

Based on the above data reported, the samples tested have met the 25 lbf tensile requirement of DVP PS-301 at both cable joints. The long cable joint easily meets the 20 ml/min leak rate requirement of DVP PS-301; while results at the short cable joint were not as good, analysis indicates that this is a problem with the cable and not with the magnetically formed joint. That this cable end is designed to attenuate 20th order noise, and the high leak rate at this joint is unlikely to have a significant effect on 10-th order performance. Repositioning of this cable joint during forming should resolve this concern and reduce leak levels to below the 20 ml/min target.

The magnetic forming process and product of the present invention allow the creation of the ideal joint for this product—the shell is formed into near-perfect intimate contact with the cable, creating a high-quality robust seal without deforming the cable. The process and product are clean, robust and relatively inexpensive in comparison to other proposed solutions, and do not require changes to the tuning cable used or the rest of the hose assembly to be effective. This has reduced leak rates at the joint from so high as to be unmeasurable (over 100 ml/min) to levels as low as 0.3 ml/min to far lower than has been measured on any radial-crimped or swedge joint yet tested.

There have thus been disclosed a method of making a fluid noise attenuation tuning cable assembly, and a resulting tuning cable assembly, that fully satisfy all of the objects and aims previously set forth. The invention is not limited to magnetic forming equipment or tuning cables provided by any particular manufacturer. A number of modifications have been described. Other modifications and variations will readily suggest themselves to persons of ordinary skill in the art. The invention is intended to embrace all such modifications and variations as fall within the spirit and broad scope of the appended claims.

What is claimed is:

1. A method of making a fluid noise attenuation tuning cable assembly that comprises the steps of:
   (a) providing a length of tuning cable having metal wires spirally wrapped to form a hollow tube,
   (b) providing a restrictor having a hollow interior and an enlarged cylindrical end shell,
   (c) placing an end of said tuning cable into said cylindrical shell of said restrictor, and
   (d) directly magnetically deforming said shell of said restrictor radially inwardly around said end of said cable by interaction of opposing magnetic fields generated in said shell and in an encircling electric coil, such that an inner surface of said restrictor shell both grips and closely conforms to the juxtaposed outer surface of said cable without crushing or deforming said cable end to thereby both securely fasten said cable to said restrictor and also to greatly reduce fluid leakage at the joint as compared to conventional swaging or mechanical crimping techniques employed to secure the cable to the restrictor, and without requiring brazing material or any other sealant material interposed between said surfaces.

2. The method set forth in claim 1 wherein said restrictor is of aluminum or brass composition.

3. The method set forth in claim 2 wherein said restrictor is of AA6061 or AA6063 aluminum composition.

4. The method set forth in claim 1 wherein said restrictor is of one-piece aluminum construction, and wherein said method comprises the additional step, prior to said step (c), of: (e) annealing said cylindrical shell of said restrictor.

5. The method set forth in claim 4 wherein said step (e) comprises the step of heating said restrictor shell at a temperature of about 415° C. for two to ten minutes.

6. The method set forth in claim 5 wherein said step of heating said restrictor is followed by the step of air cooling said restrictor.

7. A method of securing a restrictor having an open hollow cylindrical end shell, to a spirally wound tuning cable having an end disposed in said shell, said method comprising the step of directly magnetically deforming said shell radially inwardly by interaction of opposing magnetic fields generated in said shell and in an encircling electric coil sufficiently to cause an inner surface of said shell to grip and closely conform to a juxtaposed outer surface of said tuning cable end but without crushing or deforming said cable end to thereby both securely fasten said cable to said restrictor and also to greatly reduce fluid leakage at the joint as compared to conventional swaging or mechanical crimping techniques employed to secure the cable to the restrictor, and without requiring brazing material or any other sealant material interposed between said surfaces.

8. The method set forth in claim 7 wherein said tuning cable is of steel construction, and said restrictor is of brass or aluminum construction.

9. The method set forth in claim 7 wherein said tuning cable comprises dual spirally wound wires having an undulating outer surface, and wherein said restrictor shell is magnetically deformed to conform to the contour of said undulating outer surface of said tuning cable.

10. A fluid noise attenuation tuning cable assembly that comprises:
   at least one length of tuning cable having at least one wire spirally wrapped to form a hollow tube with an undulating outer surface, and
   a restrictor having a hollow end shell received over an end of said tuning cable and magnetically deformed radially inwardly sufficiently to cause an inner surface of said shell to grip said end of said tuning cable and closely conform to the undulating outer surface contour of said cable end, but without crushing or deforming said cable end, such that said restrictor shell both grips and closely conforms to the juxtaposed outer surface of said cable thereby both securely to fasten said cable to said restrictor and also to reduce fluid leakage at the joint as compared to conventional swaging or mechanical crimping techniques employed to secure the cable to the restrictor, and without requiring brazing material or any other sealant material interposed between said surfaces.

11. The assembly set forth in claim 10 comprising a pair of said tuning cables, and wherein said restrictor has axially opposed end shells respectively magnetically deformed individually over associated ends of said cables.

12. The assembly set forth in claim 11 wherein said pair of tuning cables are of differing length.

13. The assembly set forth in claim 10 further comprising an elastic hose surrounding and enclosing said tuning cable and said restrictor, and a band externally securing said hose to said restrictor.

14. The assembly set forth in claim 10 wherein said tuning cable comprises dual spirally wound wires together forming said undulating outer surface, and wherein the magnetic deformation likewise produces an undulating outer surface on said hollow end shell.

* * * * *